Dec. 21, 1937.   E. M. SAVAGE   2,102,920
DRINK PREPARING MEANS
Filed Aug. 10, 1936
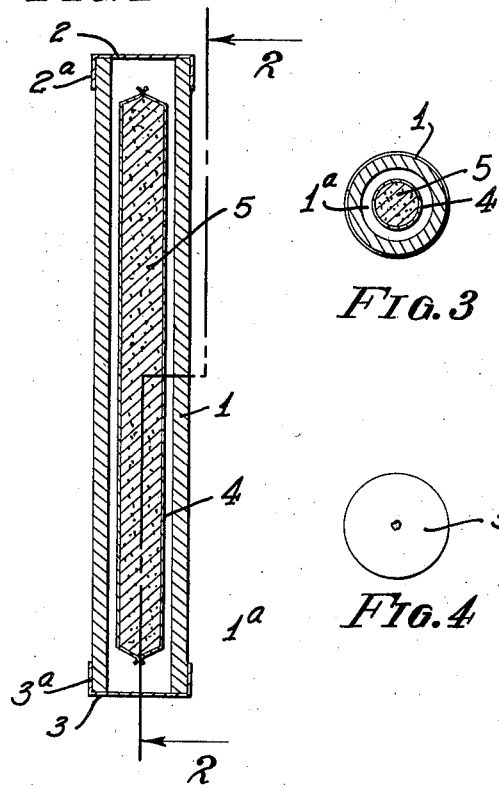
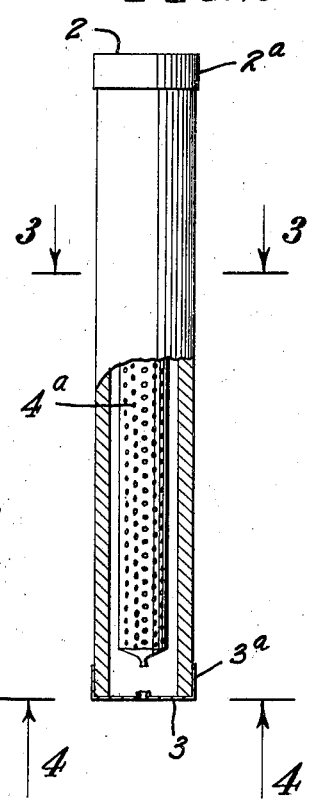
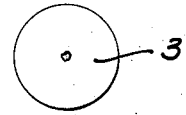
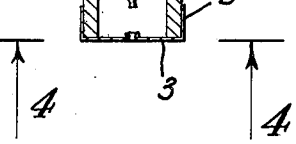
INVENTOR.
Eros M. Savage
BY
A. B. Bowman
ATTORNEY.

Patented Dec. 21, 1937

2,102,920

UNITED STATES PATENT OFFICE 2,102,920

DRINK PREPARING MEANS

Eros M. Savage, San Jose, Calif.

Application August 10, 1936, Serial No. 95,192

5 Claims. (Cl. 99—138)

My invention relates to a means and method of preparing drinks and the objects of my invention are:

First, to provide a means to be used in connection with a glass of water for providing an effervescent drink;

Second, to provide a means which may be used similar to a straw for drawing water which provides a drink;

Third, to provide a means of this class in which acid and alkali substances may be used with water for providing a combined acid and alkali drink;

Fourth, to provide a novel drink providing means which forms a preservative so that it will keep for a considerable length of time without deterioration;

Fifth, to provide a means of this class which is easily applied for forming a drink;

Sixth, to provide a novel method of preparing an effervescent drink; and

Seventh, to provide a means of this class which is very simple and economical to make, easy to apply, and efficient.

With these and other objects in view as will appear hereinafter, my invention consists of certain novel features of construction, combination, and arrangement of parts and portions and a certain method as will be hereinafter described in detail and particularly set forth in the appended claims, reference being had to the accompanying drawing which forms a part of this application in which:

Figure 1 is a longitudinal sectional view of my drink preparing means complete; Fig. 2 is a side elevational view showing a portion broken away and in section to facilitate the illustration taken from the line 2—2 of Fig. 1; Fig. 3 is a transverse sectional view from the line 3—3 of Fig. 2 and Fig. 4 is an end view from the line 4—4 of Fig. 2 in which similar characters of reference refer to similar parts and portions throughout the several views of the drawing.

My drink preparing means includes a hollow cylindrical candy member 1 over the opposite ends of which are placed cap members 2 and 3 which are easily punctured. These cap members 2 and 3 are secured over the open ends of the hollow candy member 1 by means of adhesive 2a and 3a for securing said caps 2 and 3 over the member 1 and forming a substantially air tight covering for the opposite ends of said candy member 1. Positioned in the hollow portion of the member 1 inside of the caps 2 and 3 is an envelope 4 which may be made of paper such as cellophane or the like and the ends crimped or folded together and provided with a plurality of perforations 4a shown best in Fig. 2 of the drawing.

It will be noted that this envelope may be made of a thin layer of edible material such as candy if desired and serves as a container for a compound consisting of combined acid and alkali, thus providing a soluble substance in the form of acid and alkali in the proper proportions and forming a satisfactory drink. The perforations 4a provide ready access of water for dissolving the acid and alkali.

It will be noted that instead of the acid and alkali being placed in an envelope 4, the acid and alkali can be compressed into compact form and placed in the opening 1a of the candy member 1 which will dissolve with water passing, it being noted that there is sufficient space left between the inner side or the candy member 1 and the acid and alkali compound to permit the free passage of water through the member 1 and around and through the member 4. The ends of the member 4 may be closed in any manner desired.

In using my means and method, the caps 2 and 3 are punctured with a sharp pointed instrument such as a knife or hair pin; then one end is placed in a glass of water and the other end placed in the mouth of the person drinking, and the water is drawn through the member 1, through and around the member 4 and acid and alkali compound 5. The dissolution of the acid and alkali with the water as it passes through the perforations 4a causes a very satisfying drink. What is left of the candy member 1 may be eaten, while the ends 2 and 3 and envelope 4 may be thrown away as refuse. However, if the members 2, 3, and 4 are edible, they may be also utilized as a food.

Though I have shown and described a particular construction, combination, and arrangement of parts and portions and described certain modifications thereof and a new method of preparing drinks, I do not wish to be limited to this particular construction, combination, and arrangement nor to the modifications nor to the method herein disclosed, but desire to include in the scope of my invention, the construction, combination, arrangement, and method substantially as set forth in the appended claims.

Having thus described my invention what I claim as new and desire to secure by Letters Patent is:

1. In a drink preparing means, a hollow tubular candy member, readily puncturable means for sealing the ends thereof, and a soluble acid and alkali positioned in said hollow candy member spaced from the walls thereof.

2. In a drink preparing means, a hollow cylindrical candy member sealed at its opposite ends but readily puncturable at said ends, and a perforated envelope mounted in said candy member spaced from the wall thereof.

3. In a drink preparing means, a hollow cylindrical candy member sealed at its opposite ends but readily puncturable at said ends, a perforated envelope mounted in said candy member spaced from the wall thereof, and combined acid and alkali in soluble form in said envelope.

4. In a drink preparing means, a hollow tubular candy member, means for sealing the ends thereof provided with adhesive for securing the sealing means to the ends of said candy member, an envelope mounted in the hollow portion of said candy member spaced from the wall thereof, and a soluble substance in said envelope including an acid and alkali.

5. In a drink preparing means, a hollow tubular candy member, means for sealing the ends thereof provided with adhesive for securing the sealing means to the ends of said candy member, an envelope mounted in the hollow portion of said candy member spaced from the wall thereof, a soluble substance in said envelope including an acid and alkali, said envelope being perforated to provide ready access of water to said soluble substance.

EROS M. SAVAGE.